United States Patent
Balogh

(10) Patent No.: US 9,383,587 B2
(45) Date of Patent: Jul. 5, 2016

(54) METHOD AND APPARATUS FOR DISPLAYING 3D IMAGES

(76) Inventor: Tibor Balogh, Budapest (HU)

(*) Notice: Subject to any disclaimer, the term of this patent is extended or adjusted under 35 U.S.C. 154(b) by 1101 days.

(21) Appl. No.: 13/388,143

(22) PCT Filed: Apr. 8, 2010

(86) PCT No.: PCT/HU2010/000039
§ 371 (c)(1),
(2), (4) Date: Jan. 31, 2012

(87) PCT Pub. No.: WO2011/012913
PCT Pub. Date: Feb. 3, 2011

(65) Prior Publication Data
US 2012/0127320 A1    May 24, 2012

(30) Foreign Application Priority Data

Jul. 31, 2009 (HU) .................... 0900478

(51) Int. Cl.
H04N 13/04     (2006.01)
G02B 27/22     (2006.01)
G02B 5/02      (2006.01)

(52) U.S. Cl.
CPC .......... *G02B 27/2214* (2013.01); *G02B 5/0257* (2013.01); *G02B 5/0278* (2013.01); *G02B 5/0284* (2013.01); *H04N 13/0425* (2013.01); *H04N 13/0459* (2013.01)

(58) Field of Classification Search
CPC .......... H04N 13/0497; H04N 13/0404; H04N 13/0409; H04N 13/0422; G02B 27/2214
USPC .......................................... 348/51
See application file for complete search history.

(56) References Cited

U.S. PATENT DOCUMENTS

2007/0218261 A1* 9/2007 Saitoh et al. .................. 428/212
2013/0147798 A1* 6/2013 Karsch et al. ................. 345/420

FOREIGN PATENT DOCUMENTS

WO    2005117458       12/2005
WO    WO2005117458   * 12/2005  ............ H04N 13/00
WO    2007121440      10/2007

OTHER PUBLICATIONS

European Patent Office, International Search Report PCT/HU2010/000039, Aug. 25, 2010 (3 pgs.).

* cited by examiner

*Primary Examiner* — Daniel Tekle
(74) *Attorney, Agent, or Firm* — Wood, Herron & Evans, LLP

(57) ABSTRACT

A method and an apparatus for displaying 3D images are disclosed. 2D images are projected from multiple points to a surface with narrow diffusion characteristics, thus it is possible to get a 3D light field with arbitrary angular dependence. According to the invention, the projectors (10) do not target particular screen (12) points. The projectors (10) are directed to the screen (12) with no special positioning, however from the bunch of light beams present, pertaining to the large number of pixels in the projected images, it is possible to select and define a pixel-wise precise 3D light-field through a calibration process. A novel calibration method and device are also described for calibrating 3D display systems, the device being equipped with proper image sensor(s) and a control system.

27 Claims, 13 Drawing Sheets

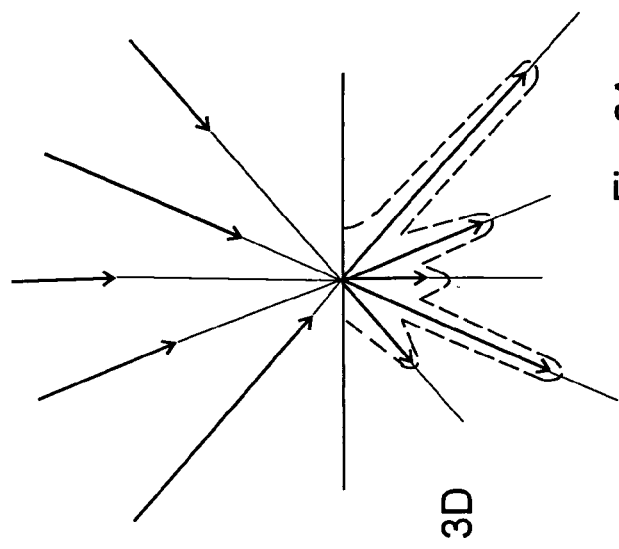
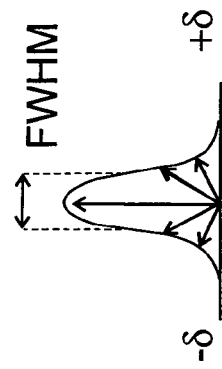
Fig. 2A
Fig. 2B
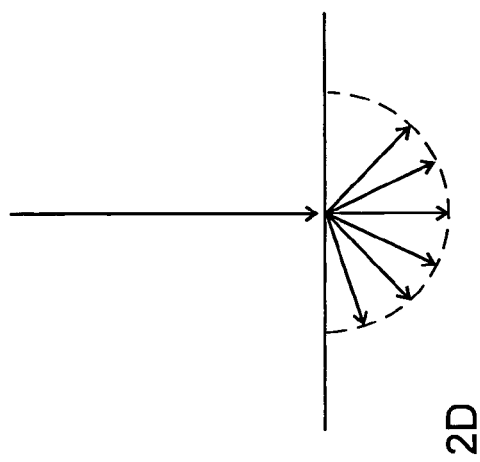
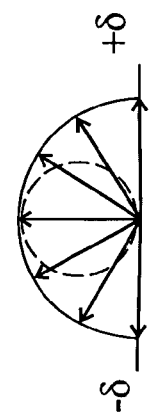
Fig. 1A
Fig. 1B

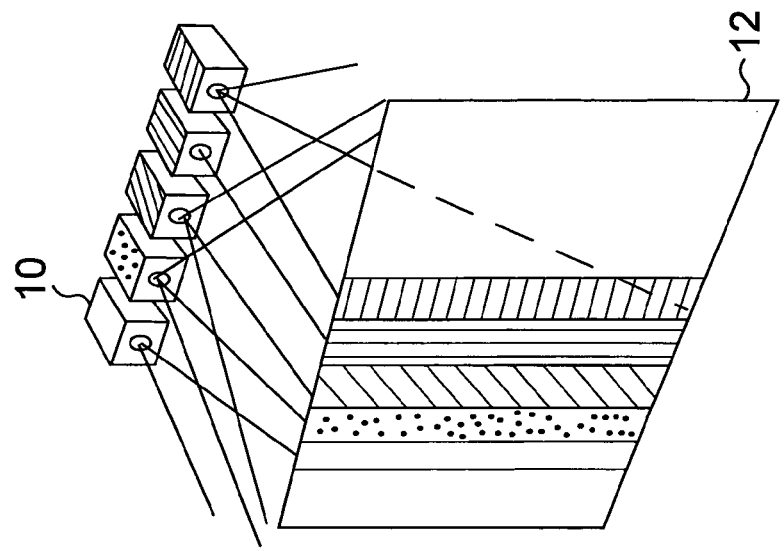
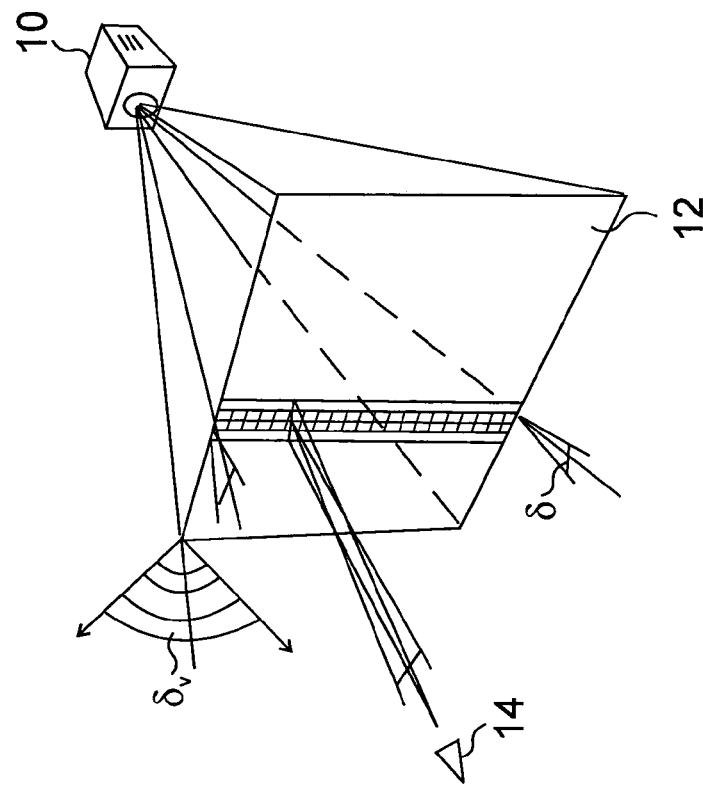
Fig. 5B
Fig. 5A

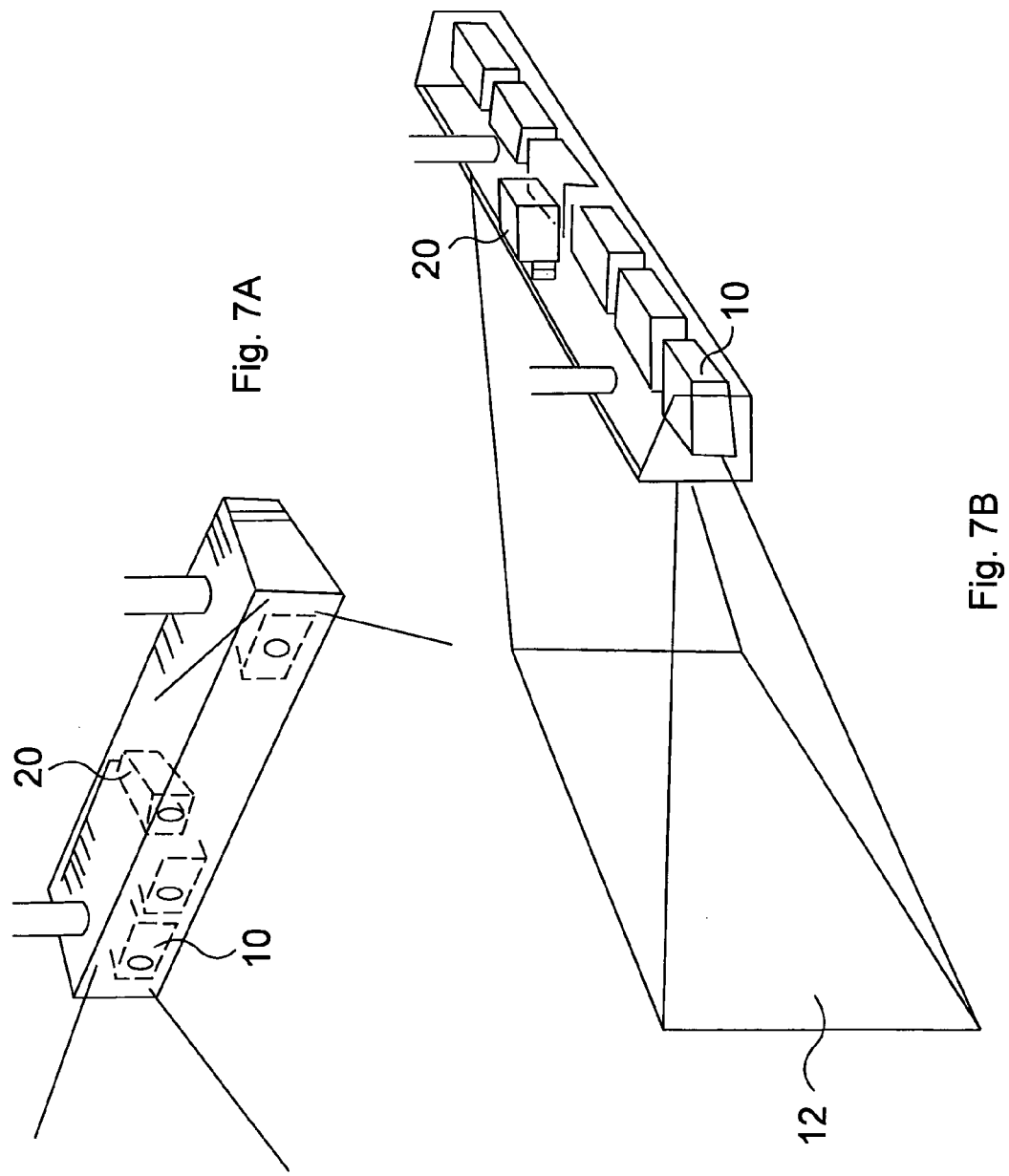

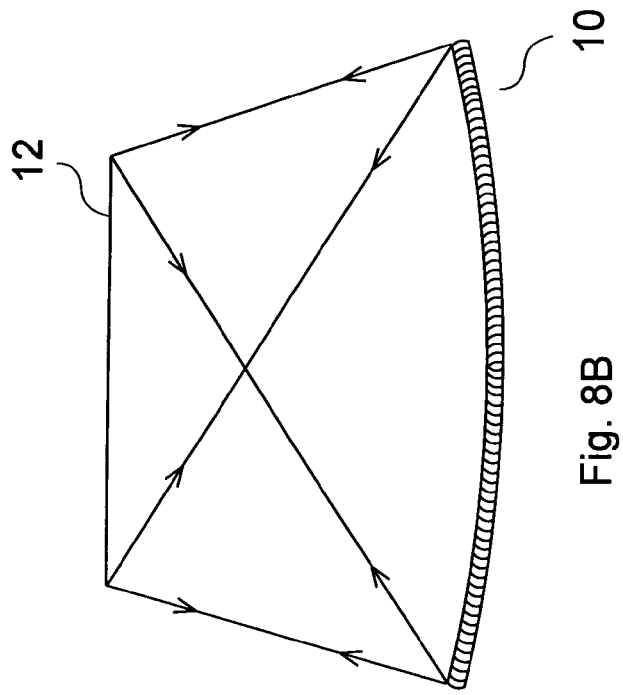
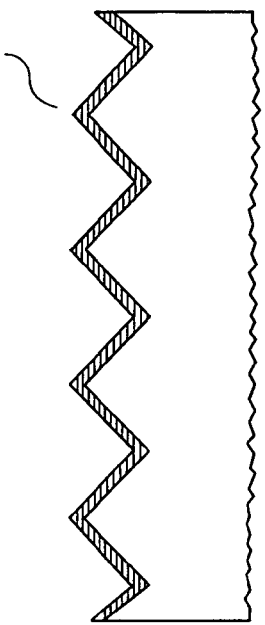
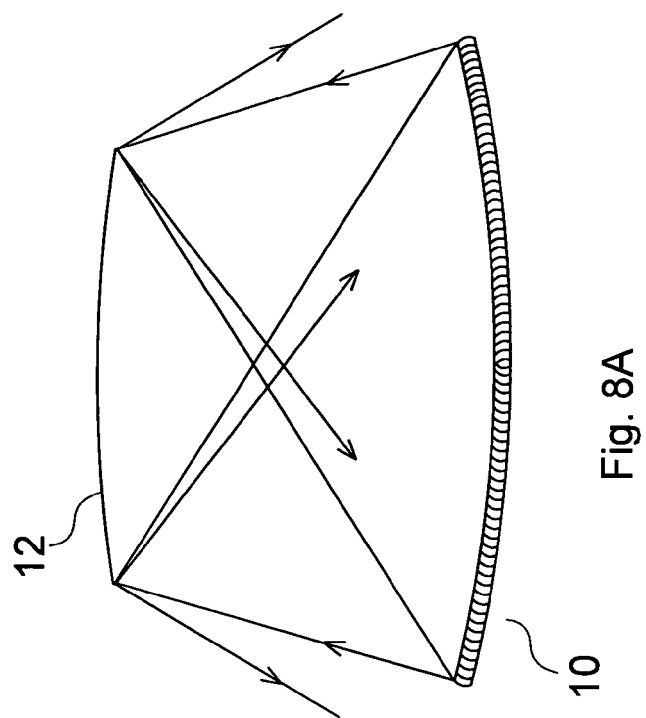
Fig. 8A
Fig. 8B
Fig. 8C

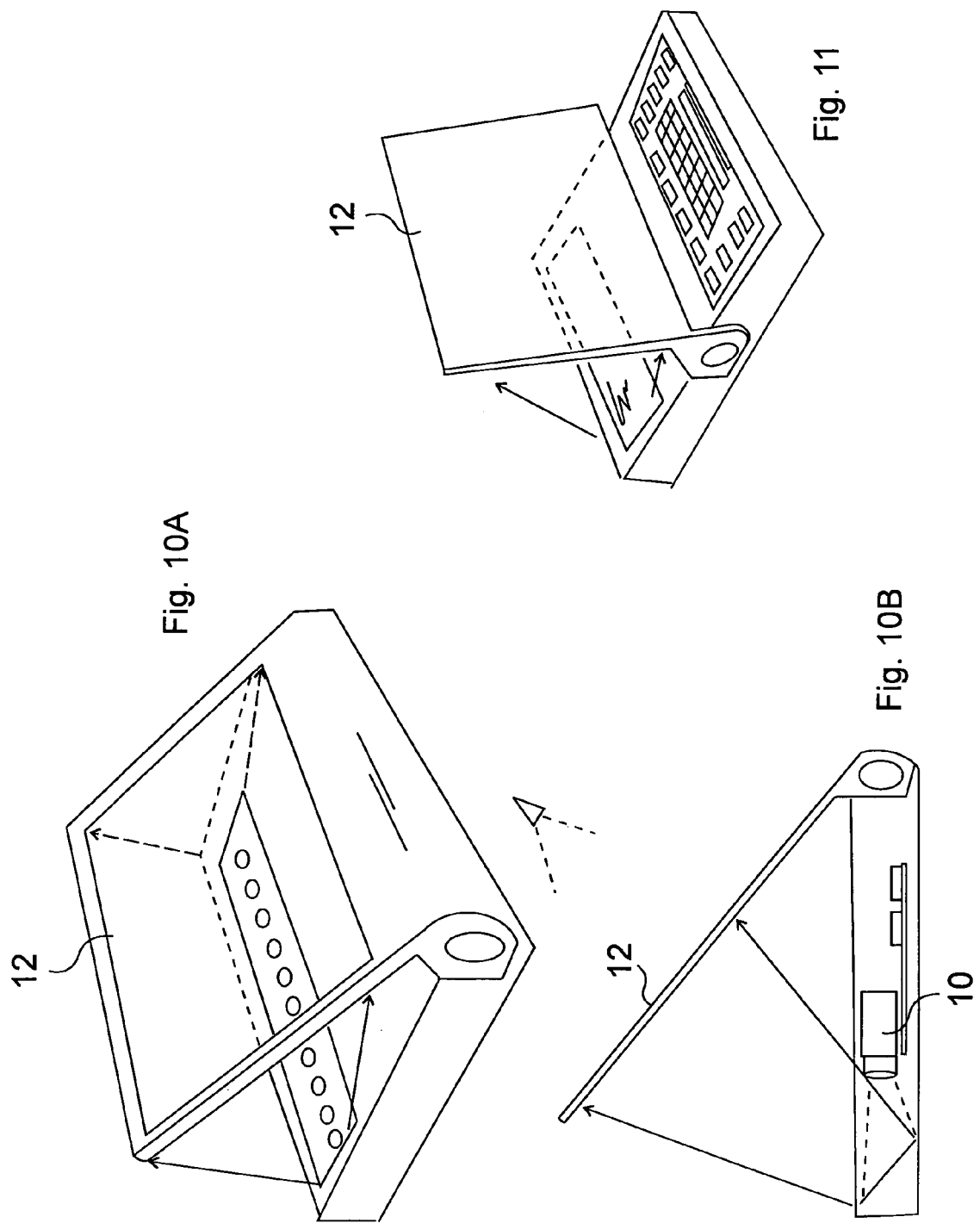

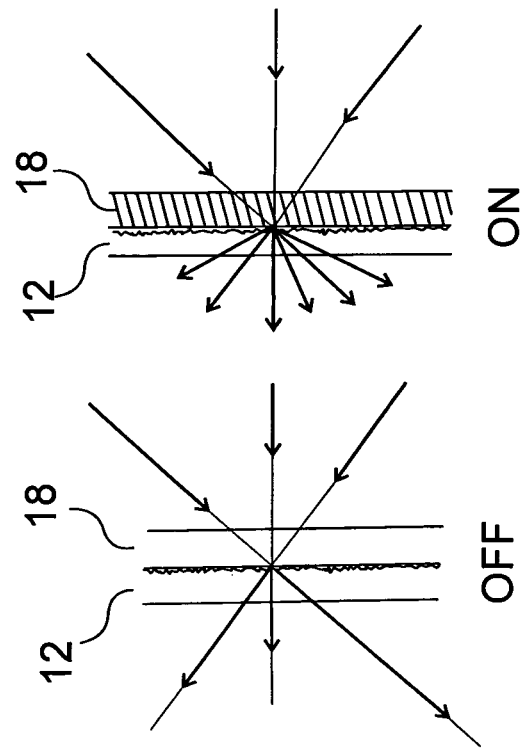
Fig. 15A OFF
Fig. 15B ON
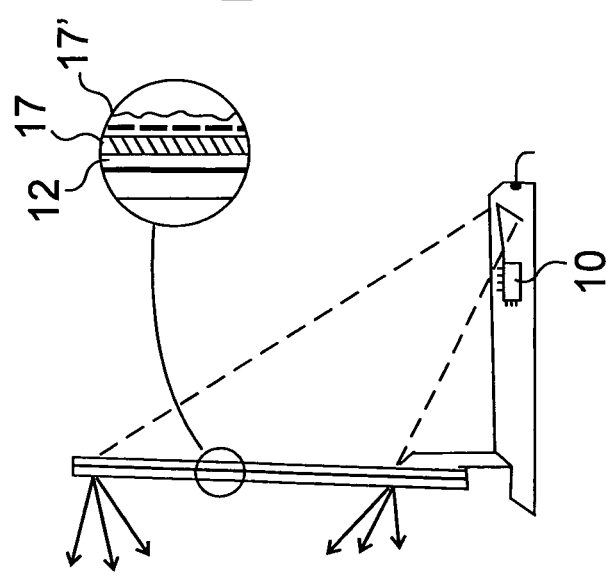
Fig. 14A
Fig. 14

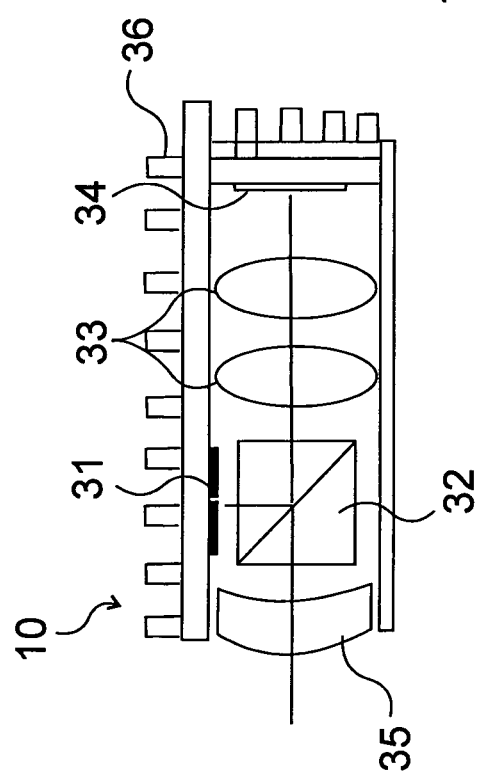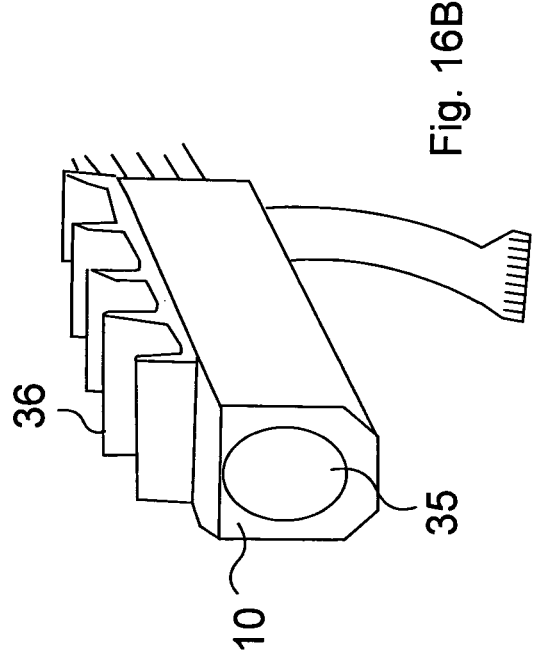

METHOD AND APPARATUS FOR DISPLAYING 3D IMAGES

This application claims priority, under Section 371 and/or as a continuation under Section 120, to PCT Application No. PCT/HU2010/000039, filed on Apr. 8, 2010, which claims priority to Hungary Application No. P 09 00478, filed on Jul. 31, 2009.

TECHNICAL FIELD

The invention relates to a method and an apparatus for displaying 3D images, as well as to a method and a device for calibrating the apparatus.

BACKGROUND ART

Methods and systems for generating 3D images are disclosed e.g. in WO 01/88598 A2, WO 2005/117458 A2, the teachings of which are incorporated by reference. The known apparatuses comprise multiple optical modules projecting light beams onto a diffuser screen, thus with proper control, light beams of different color and intensity are propagating from each point of the screen, reconstructing a 3D light field. As a viewer is changing her/his position in the 3D light-field, the perceived 3D image changes accordingly, thereby a true 3D, real life effect is provided.

However, it is a general problem in the prior art solutions that in the process of changing a viewer's position in the 3D light-field, depending on the physical adjustments of the projectors, the diffusion angle of the screen, the optical imperfections, distortions, geometrical or color misalignments, and/or brightness/contrast differences between the projectors, the viewer (observer) will perceive a fluctuation of the intensity, i.e. inhomogeneities will appear at the transitions between two 3D images. In case if the misalignments and/or differences reach a certain value, the angle of divergence (diffusion angle) of the screen is to be set too high to compensate intensity inhomogeneities and display errors, whereby the observer will perceive visual noise caused by the crosstalk between the neighboring 3D images, i.e. where the light beams of neighboring 3D images overlap. For the observer the perceived image will then be blurred, the neighboring views will be simultaneously present in the 3D image and the apparatus will not be capable of displaying images with sharp contours.

Furthermore, the screen diffusion characteristic is a critical factor in such systems, and unfortunately, this Gaussian intensity distribution is inherent in all practical diffusers even in holographic diffusion screens. The uneven total intensity or the undesirable crosstalk is practically unavoidable since these are conflicting requirements; this fact strongly limits the performance of such systems. If the systems are not finely calibrated, serious alignment, color dispersion problems can arise, which again cause a deterioration of the perceived image.

DESCRIPTION OF THE INVENTION

It is an object of the invention to provide a 3D light-field generating method and apparatus, which eliminate the drawbacks of the prior art and enable practical systems based on less complex projection components. It is another object of the invention to provide an efficient calibration device and method for the inventive apparatus.

The above objects have been achieved by the methods according to claims 1 and 17, as well as by the apparatus and calibration device according to claims 3 and 23, respectively. Preferred embodiments are defined in the dependent claims.

BRIEF DESCRIPTION OF DRAWINGS

The invention will hereinafter be described on the basis of preferred embodiments depicted by drawings, where FIGS. 1A, 1B and 2A, 2B are schematic drawings of the principle behind the invention, FIGS. 7A-7C are schematic views of a front-projection embodiment used in a 3D cinema, FIGS. 8A and 8B are schematic drawings of the view area with a curved mirror-like reflective screen and a retroreflective screen, respectively, FIG. 8C is a preferred retroreflective screen structure, FIGS. 10A and 10B are schematic views of a fourth embodiment used in a PDA device, FIG. 11 is a schematic view of a fifth embodiment used in a mini laptop device, FIGS. 14 and 14A are schematic drawings of a 3DRPTV device with a preferred screen configuration, FIGS. 15A and 15B show the operation of a controllable diffusion screen with a switchable LC film, FIG. 16A is a schematic cross sectional view of a preferred projector for the apparatus, and FIG. 16B is a schematic view of the projector having an inner structure depicted in FIG. 16A.

MODES FOR CARRYING OUT THE INVENTION

The final goal of displaying, especially at 3D displaying, is to reconstruct the visible light beams from a real scene, in other words the goal is to reconstruct the 3D light field as present in the natural view Light field is the most general representation of 3D information that considers a 3D scene as the collection of light rays that are emitted or reflected from 3D scene points. The visible light beams are described with respect to a reference surface, at displays this is the screen, using the light beams' intersection with the surface and the transmission angle. The intersection is given as a position on the surface using some parameterisation, while the direction is given as the deviation from the surface normal with some angular parameterisation.

At the 3D displaying compared to the 2D, there is an additional independent variant: the angle, While at 2D displaying ideally there is no change at a pixel when watched from different directions, at 3D the color and intensity values (of the light beams coming from a pixel) change with the angle. This is the background that by principle a 3D image contains more information than a similar 2D, with consequences on the complexity of the optical and control arrangement necessary at 3D systems.

In general, 2D images are projected from one single point to a diffuse surface, a screen with wide diffusion angle δ, resulting in a homogeneous light distribution with no angular dependence, as shown in FIGS. 1A and 1B. To obtain a 3D image it is necessary to be able to generate different intensities/colours from the same point of the surface. To achieve 3D imaging, the projection is performed from multiple points to a surface with narrow diffusion characteristics, thus it is possible to get a 3D light field with arbitrary angular dependence, as depicted in FIGS. 2A and 2B.

FIGS. 3 to 5B demonstrate the basic principles used in the inventive apparatus and method for generating a 3D light-field 13. A viewer can perceive 3D images in the 3D light-field 13, wherein the position of the viewer in the 3D light-field 13 determines which one of the 3D images is perceived.

Figure 3:
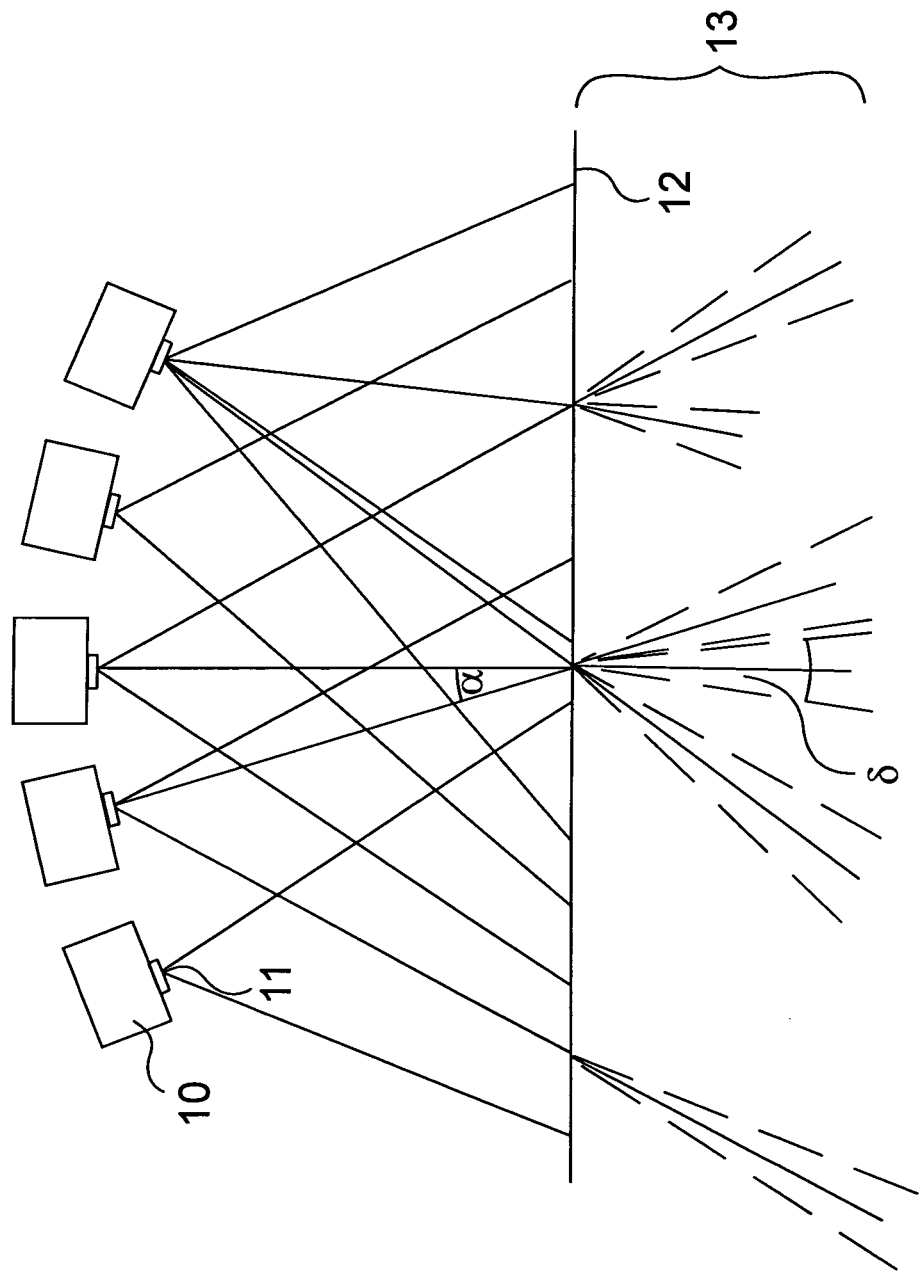
FIG. 3 is a schematic diagram of a first embodiment of the inventive apparatus.

According to the invention, as can be seen in FIG. 3, 2D images are projected onto a diffuser screen 12 by means of multiple projectors 10, wherein light beams from the pixels in each of the projected 2D images transmitted or reflected by the screen address spatial positions of points of a perceived 3D image in the 3D light-field 13 and wherein each 2D view of the 3D light-field 13 is composed of multiple projector 10 images.

The light beams from the pixels of the 2D image projectors 10 do not address physically separated screen points. The diffuser screen 12 has an overall uniform, optically continuous structure, i.e. it is optically identical at any areas smaller than the pixels of the projected image.

The diffuser screen 12 has a diffusion angle δ equal to or larger than the largest angle α between optical centers 11 of neighboring projectors 10 as seen from any screen point. So, the diffuser screen 12 performs a limited (predetermined) angle diffusion to eliminate inhomogeneities resulting from the gaps between the projectors 10, without changing the principal direction of light beams projected onto the screen 12, thereafter transmitted or reflected. The diffusion angle is thus corresponding to or determined by the arrangement of the projectors, more particularly by the angle between the optical centers of neighboring projectors as seen from a screen point, thereby enabling smooth transitions between the views of 3D images in the 3D light-field 13 when a viewer's position in the 3D light-field 13 changes The directions of light beams leaving the screen are substantially determined only by the relative positions of the different screen points and the positions of the optical centers of the projectors 10. A projector 10 is not associated to a direction and the light beams in each of the projected 2D images address the spatial positions of the displayed object points performing 3D light-field reconstruction and thus the projected image is not a 2D view of the final 3D image and is different of any 2D view of the displayed 3D image.

Moreover, the displayed 3D image and the projector 10 image aspect and resolution can be different. Since the resulting 3D image is contributed by multiple projectors 10, contrary to prior art solutions, high resolution 3D image can be obtained even from several lower resolution projectors 10. A projector can project just part of the screen 12, or can project multiple light beams to the same screen area, applying mirrors, reflecting back to the screen parts of the projected 2D images.

Each 2D view of the 3D image comes from multiple projectors 10, as a combination of 2D image segments on the various screen areas, depending on the view point, as can be seen on FIGS. 5A and 5B for a horizontal-only-parallax arrangement, as an example. The viewers always see different 2D view of the displayed 3D image by each eye, composed of multiple 2D images on the different screen areas. When moving in front of the screen, the boundaries between the individual views change continuously according to the viewers' position relative the projectors 10, with simultaneous transitions distributed to different screen areas, so that the viewers can see (from any position) images projected with proper perspective information, providing continuous motion parallax to the viewers. Accordingly, there is no point in the field of view where light beams from only a single projector image would be seen, and contrary to multi-view systems, no borders appear between discrete views of the 3D images.

The 2D images projected by the projectors 10 are generated from the image to be displayed by appropriate algorithms. Such algorithm can be e.g. to cut/generate segments from existing image data and merge them into 2D images to be projected. If the 3D image is to be displayed on the basis of computer generated digital data, each light beam can be calculated and generated by the appropriate projectors 10.

The 3D light field 13, as a resultant of all the light beams projected from the pixels of the projectors 10, is independent of the position of the viewer and at each point of the 3D light field 13 different light beams are present. This applies also for the two different points of a viewer eyes' position, enabling to perceive a 3D image and when viewers change their position in the 3D light-field 13, it determines which one of the 3D images is perceived, as in the natural view.

Since humans eyes are displaced horizontally and viewers typically move horizontally, the horizontal parallax is much more important in collecting spatial information than the vertical parallax. This enables significant simplification, to build horizontal-only-parallax systems, as practical embodiments.

The 2D image projectors 10 are preferably arranged horizontally, substantially in periodic, optically equal, dense positions, projecting multiple 2D images on to the screen 12.

As discussed in the introduction, the quality of transitions between views is a general problem at all 3D displays. Any of the inhomogeneities or crosstalk effects are disturbing and highly visible, which is unacceptable at high quality displaying. On the other hand, the smaller is the angle between neighboring projectors 10 the deeper 3D view can be displayed. The diffusion angle δ, often defined with the full-width-at-half-maximum (FWHM) value, is to be selected (adjusted) in line with the considerations below.

If the diffusion angle δ is too large, the viewer perceives visual noise caused by the crosstalk between neighboring views of the 3D image, i.e. in the directions, where the neighboring 2D images overlap because of the wider-angle scattering. Therefore, the diffuser screen 12 preferably has a diffusion angle δ equal to the largest angle α between optical centers 11 of neighboring projectors 10 as seen from any screen point. When considering a given screen point, it is apparent that the largest angle α will be the one relating to the closest two projectors 10. The other projector pairs will be seen under a slightly smaller angle. Therefore, the diffusion angle δ of the diffuser screen 12 should be at least equal to this largest angle α, so as to ensure that there are no fluctuations of the intensity, i.e. no inhomogeneities in the 3D image at any viewing positions. Thereby the visually perceived image is not flawed with unlit parts, and the viewing region is continuously covered, i.e. a continuous motion parallax is achieved.

In a practical embodiment the projectors are densely stacked. The term "neighboring" is understood that the projectors need not be physically neighboring, it is sufficient that they optically appear to be beside each other, if seen from a screen point.

Figure 4:
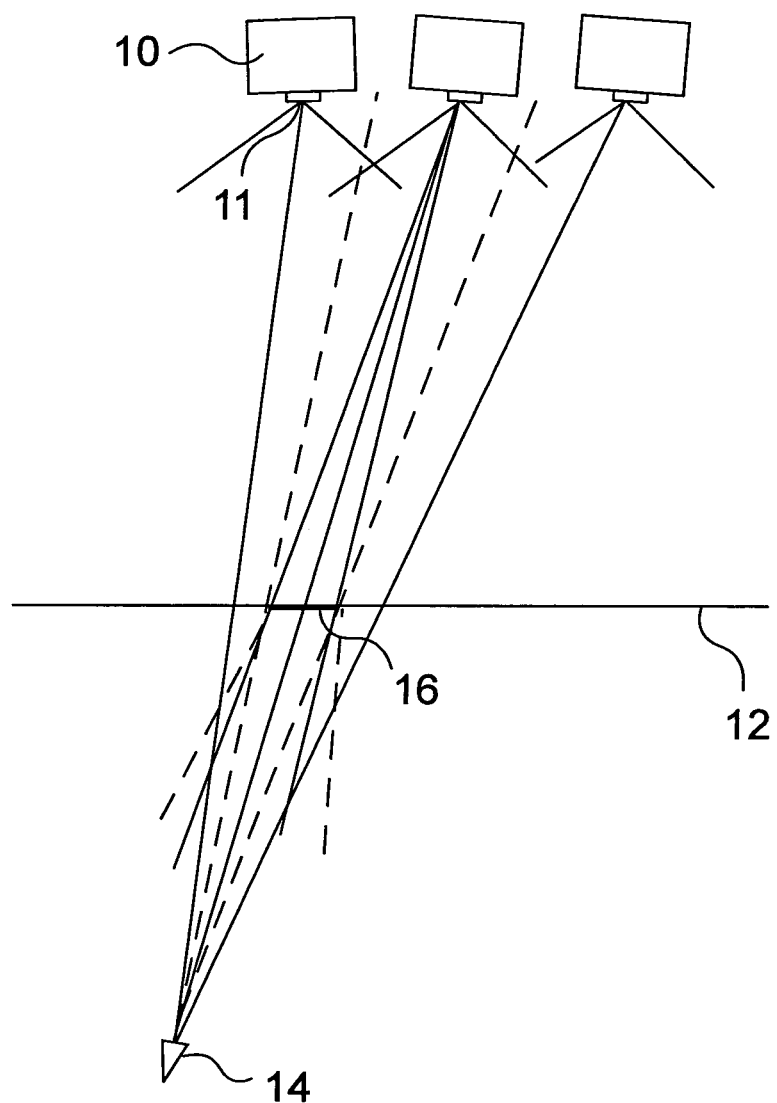
FIG. 4 is a schematic diagram depicting the functioning of the embodiment as of FIG. 3, FIGS. 5A and 5B are schematic diagrams depicting vertical segments of the displaying mechanism of the preferred embodiment as of FIG. 3.

FIG. 4 shows how an eye 14 of a viewer perceives the projected 3D image in the 3D light field 13. The diffuser screen 12 will forward the relevant image on a segment 16 of the screen 12 for the eye 14 of the viewer. In an other direction an other segment will be in the view, with another projector 10 behind, as shown in FIG. 5B. With the diffusion of the screen 12, it is further ensured that a light beam arrives to the eyes of the viewer from all directions from each screen points, which allows the viewer to perceive a continuous image within the angular region. It can be also clearly seen that the complete view associated to the individual viewing directions is not produced by one projector, but by all of them. This arrangement ensures that if the viewer changes position, and his/her viewing point changes, the perceived light beams transferred by the screen 12 and creating the image for the eye 14 also change continuously. In this manner, a continuously changing image is created. It can be also seen that beams from different projectors reach the right eye and the left eye of the viewer from the individual screen points. This basically means that the same screen point is able to transmit different information towards the different directions, including the left and right eyes, respectively.

It can also be seen that objects in front of and behind the screen 12 can equally be displayed with the help of the inventive apparatus. The light beams produced by the apparatus are exactly the same as if they had started from the object to be displayed. A lifelike image is displayed in all directions within the projection angle range, regardless of the position of the viewer. It is emphasized that the apparatus continuously projects light beams also in directions in the viewing area where there are no viewers at all.

As the viewer moves in front of the screen (continuous horizontal parallax) he/she can see the details appearing/disappearing, it is even possible to look behind the objects. The shadows and the highlights move as in the natural scenes. This level of realism is hard to be experienced at stereo or multiview 3D systems. The view changes continuously according to the perspective. The invented system reconstruct the 3D light-field, the spatial positions of the 3D objects are fixed, does not change when a viewer changes its position, like the viewer dependent view at stereo. In other words the system is viewer independent, no special need for tracking, unlimited number of viewer can simultaneously see the screen and viewers see different details when standing in different positions within the field of view. The system enables real collaborative usage inducing enhanced motivation in gaming scenarios.

A 3D image contains much more information than a similar 2D, thus in a 3D system much more pixels or higher speed components are needed. Systems that do not have this capacity the images are compromised, like the necessity of wearing glasses, or the jumping of multi-view images, or the limited depth capability. The described principle is a parallel distributed way of image organization. Through this approach it is possible to build modular systems with very high number of pixels in the range of 100 Mpixels, orders of magnitudes higher than conventional display panels.

FIGS. 5A and 5B depict a preferred embodiment, in which the multiple projectors 10 are arranged horizontally (in FIG. 5A only one of them is depicted), and the diffuser screen 12 has an asymmetric diffusion character. Asymmetry in this context means that the diffusion angle $\delta$ is understand to be the horizontal diffusion angle of the diffuser screen, and the vertical diffusion angle $\delta_V$ of the screen 12 is larger than its horizontal diffusion angle. In this way a continuous horizontal motion parallax is achieved independently from the height of the viewer's eyes in the 3D light-field 13. The large vertical divergence also contributes to compensate vertical offsets between the projectors 10. FIG. 5B shows how the perceived image is composed for the viewer's eye 14; patterns on the projectors and the screen segments show which projector is responsible for which segment. The precise composition of the perceived image requires that the projectors 10 are calibrated, as will be discussed later on.

The projectors project 2D (composite) images corresponding to their different horizontal positions, providing horizontal parallax in the resulting 3D light-field 13, while the view on each 2D (composite) image corresponds to the same vertical position, i.e. the 2D images do not contain vertical parallax information. In this case the light beams projected to the pixels of the 2D (composite) images address only the horizontal positions of the displayed points, while vertically from all projectors 10 they address the same height on the screen 12, which is the vertical position of the point projected to the screen surface from the ideal viewer's perspective. In other words, at horizontal only parallax (HOP) systems the light beams address the point's horizontal position relevant to the 3D light field, containing HOP information only vertically they target the same height corresponding to the projection of the points' vertical position onto the screen surface.

The scope of the invention covers all of arrangements where numerous projection modules, particularly video projectors, are arranged periodically in the horizontal direction, projecting images with different horizontal parallax information to a screen. The screen has large vertical diffusion, almost like a vertical diffuser to provide large vertical viewing angle, at the same time eliminating the vertical differences between the vertical positions of projectors (if arranged in several rows), while the horizontal diffusion is significantly smaller keeping the original direction of the incident light beams horizontally.

Figure 6:
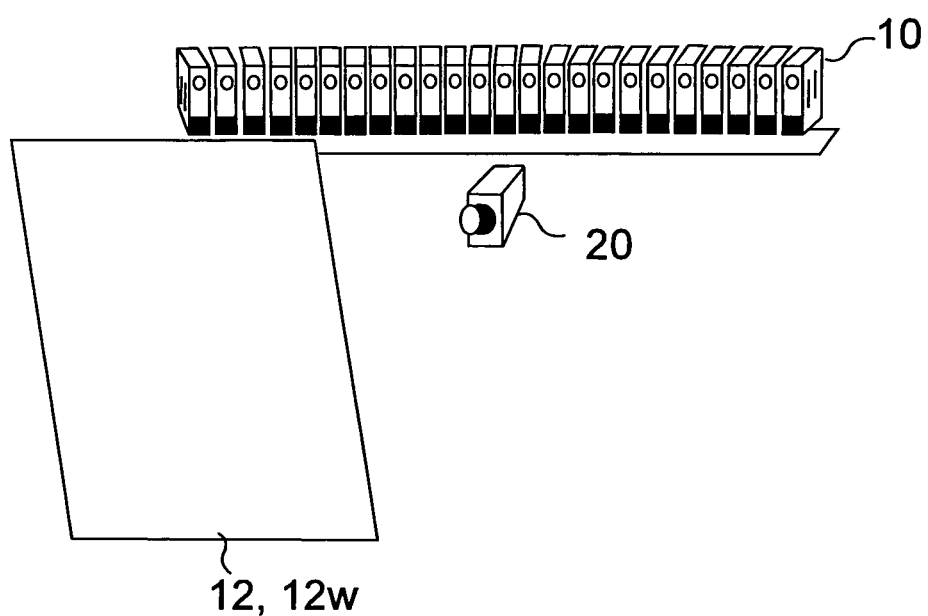
FIG. 6 is a schematic view of a preferred back-projection embodiment of the apparatus with a calibration device.

FIG. 6 shows a schematic diagram of a preferred embodiment of the inventive apparatus with a transmissive diffuse screen 12 and compact projectors 10 in standing configuration to be stacked more densely. The embodiment is particularly advantageous in digital promotional, shopwindow applications, since the screen 12 can be hang independently of the separate 3D projection unit, i.e. the stacked projectors 10, allowing easy installation, flexibly matching the available space conditions.

The screen 12 can also be transparent with partly diffusing character, transmitting a part of the incident light without diffusion, and if off-axis projections is applied, e.g. the projection unit is placed above close to the ceiling or put on the ground facing steeply up to the screen, 3D shopwindow applications can be even more dramatically fulfilled.

As already indicated, since the two eyes of an observer are in a horizontal plane, a human observer is naturally more sensitive to changes in horizontal views. It is important to emphasize, that providing vertical parallax information is possible according to the principle of the invention, however it would require further groups of lines of projectors compared to horizontal-only-parallax (HOP) systems and would substantially increase the cost of the apparatuses.

The projectors 10 can be any controllable projecting devices, such as video projectors, data projectors, video projector optical engines, RPTV optical engines, LED projectors, laser projectors, micro-, nano-, or pico-projectors, projectors based on scanner components, or projectors based on microdisplays like DMD, LCOS, OLED or LCD. Furthermore, the projectors 10 can also be based on diffractive imaging, containing microdisplays enabling lens-less holographic projection to the screen. There is a strong increase in the small size projector segment, even if the resolution and brightness of these projectors are compromised by their size thus their usage is limited as independent projection units. The invented multi-channel 3D projection system can however take the advantage of these emerging category devices in building high pixel-count, proper brightness systems in a cost-effective way.

The diffuser screen 12 is preferably a holographic screen, a microlens array, a structured volumetric diffuser film, a lenticular sheet, a retroreflective screen, a refractive or diffractive diffuser sheet, Fresnel lens or any combination thereof, or a surface created by a laminar flow of a substance.

In a particularly preferred embodiment used in a 3DRPTV (rear projection television) depicted in FIG. 14, the screen 12 comprises more than one diffusive layers aligned slightly rotated relative to each other. In the case if two narrow angle diffuser layers 17, 17' are rotated relative to each other, the resulting diffusion angle will be wider, proportionally to the rotation angle. It is extremely difficult to manufacture diffusers with an accurate angle within the specified tolerances, because the final diffusion character is highly dependent on production parameters. By this alignment it is possible to realize a continuously tunable diffuser, to make a screen with precise diffusion that matches the optical requirements of the projector arrangement of the apparatus.

As depicted in FIGS. 15A and 15B, it is of preference if the screen 12 has a controllable diffusion, comprising a passive diffuser layer and an active diffuse layer 18, like a switchable LC film. In this way even the diffusion of the screen 12 can be adjusted to the particular applications or changes in operating conditions. By dynamically changing the diffusion angle of the screen 12, the display can be optimized for various contents. The screen diffusion angle is sensitive parameter. In case it is too narrow, inhomogeneities can appear in the final 3D image coming from the gaps between the projectors, if it is too wide, it decreases the field of depth of the displays, while at 3D images of limited depth a wider diffusion angle is allowable. For displaying 2D images, a fully diffusing screen 12, ideally with a 180 degrees diffusion angle, can add an advantage of completely mixing light beams coming from different projectors, eliminating residual inhomogeneities in the final 2D image. At the calibration process fully diffusive screens, reflecting or dispersing light in 180 degrees, give more flexibility enabling 2D pattern based algorithms.

The screen 12 is preferably transparent with partly diffusing character transmitting a part of the incident light without diffusion. This allows arrangements, where virtual 3D objects are mixed with real scenes in virtual or augmented reality (VR or AR) systems, but this is also an optimum arrangement for a shopwindow applications, where viewers/customers can see the exhibited goods through the transparent screen, also in combination with the displayed 3D objects.

The screen 12 preferably further comprises
- layers directing the projected light beams optimally towards the viewers typical height, like direction turning films, cylindrical Fresnel lenses, or
- layers blocking light incident from other directions than from the projectors 10, typically lenticular arrays with black matrix. Layers directing light towards the viewers typical height in horizontal only parallax (HOP) systems do not play role in the 3D imaging, since do not make any change, diffusion horizontally, however can increase the brightness, by directing more light towards the viewers, improving system efficiency, lowering power consumption.

Layers blocking light from other directions than of the projectors allow more practical, open arrangements also in well-lit, daylight environments. There is no need for shading or closed box style design in such cases, since the screen can eliminate ambient or scattered lights, providing proper contrast, similar as achievable only in dark rooms.

It may happen that the 3D information provided in any format for the apparatus does not contain all the information necessary to drive all the projectors 10, e.g. when the angular displacement between the source view images is larger than the angle between the neighboring projectors 10. For this case the apparatus may comprise a control system autonomously calculating intermediate images from the images inputted to the apparatus.

Preferably, a high-capacity fully optimized parallel processing 3D software environment controls the hardware system of the apparatus. The software environment provides solution to display 3D from a wide variety of 3D data ranging from standard 3D model formats, through wrapping 3D applications, to handling 2D image sets containing 3D information, additional depth maps, or multiview video streams. The software environment provides an easy way to visualize a wide range of 3D applications, also including games, on-the-fly. The software environment manages a real-time, highly optimized and distributed rendering process that creates data for 3D vision. Applications do not have to be changed in any way, generation of 3D imagery is totally transparent for OpenGL-based applications. Support for Windows and Linux, 32-bit and 64-bit platforms ensure compatibility with existing real-time graphics systems.

More preferably, the control system of the apparatus also comprise an input device, such as a camera, IR sensor or other tracking device for assisting in optimization for the viewers position, to create highly realistic 3D images rendering environmental illumination on the 3D objects with realistic shadowing, performing texture mapping or enabling interactions with the displayed 3D objects.

It is rather difficult to precisely align multi-channel optical systems. Pixel precise alignment is almost impossible. It would require massive mechanical and distortion free optical components, resulting in extreme system costs, still sensitive to thermal changes or mechanical movements, making such systems hardly work in practice. At the invented system, as a practical advantage, we make possible the use any kind of, even low-end components, projectors, with different brightness, color balance, significant distortion, roughly aligned mechanical parts, still achieving high-quality, high-resolution final 3D image.

As of the inventive principle the projectors 10 do not target particular screen 12 points. The projectors 10 are directed to the screen 12 with no special positioning, however from the bunch of light beams present, pertaining to the large number of pixels in the projected images, it is possible to select and define a pixelwise precise 3D light-field through a calibration process.

FIG. 6 shows a schematic diagram of an embodiment of the inventive apparatus with a calibration device. The calibration device comprises
- at least one image detector 20 for detecting images projected by the projectors 10 onto the diffuser screen 12,
- evaluating means for evaluating the detected images,
- calibration data generating means for generating calibration data for the projectors 10 based on the evaluation, and
- modifying means for modifying the input data of the projectors 10 on the basis of the respective calibration data.

In the following we describe a method and apparatus for performing calibration on projection type 3D display systems. Prior art projection calibration methods and apparatuses relate mostly on tiled 2D projection arrangements, where large size, high resolution images were composed of more tiled projected images, or the projection was made on other than plane surfaces. The task to be typically solved was matching the geometry and blending the brightness e.g. with shaped shading of the various projectors at the overlapping edge areas. These methods can be applied at 2D projection, however at the 3D projection as in the invented method and apparatus, all the projectors 10 project their images on the same screen 12 area. It is almost impossible to separate the images, especially the black levels projected on each other, hard to calibrate two or more projector images side-by-side to each other simultaneously, which is not a problem at 2D, it is extremely difficult to reliably register image segments projected on narrow angle diffuse screen 12, where every image segment position and relative brightness change with the angle and the image detector position in the 3D light field 13. For calibrating multichannel 3D projection systems novel methods and apparatus should have been set.

The image detector 20 is preferably a calibration camera. There are two possible calibration arrangements. In the case of multiple calibration camera positions the calibration is made in front of the display, in the display's active 3D lightfield. Calibration on each camera position will result calibration data to a subset of the available projector pixels. The advantages of this arrangement are as follows:
  all the screen elements are available for calibration—the calibration camera is working on the real view, all the elements with their distortions will be calibrated,
  it can be applied to any kind of display—it is not necessary to integrate the camera into the display,
  calibration can be made on the maximum brightness of the display.

The drawbacks of this arrangement are, however, that:
  the process is slow and not fully automatic,
  it has to be done in darkened and controlled environment,
  there is a certain error coming from the positioning of the calibration camera which will result in a "washing effect" as the viewer is moving in front of the screen.

Alternatively, in a single calibration camera arrangement all projector pixels are made visible from a single camera position. In this case the wide diffusion angle screen 12w is used as an ordinary 2D display. The advantages of this arrangement are as follows:
  no errors result from the calibration camera position,
  fast calibration process,
  the calibration is inside the display, so the calibration process can be done in almost any kind of environment.

The drawbacks of this arrangement are, however, that:
  the camera should be built in the display,
  it can be applied to proper brightness displays, where the brightness of the display is enough to light through or to be reflected from an additional wide angle diffusor (e.g.: matt white surface) and still can be seen on the calibration camera captured image,
  the screen 12 itself will not effect its distortions on the calibration image (because it is covered), so the calibration will not fully compensate the screen's 12 distortions.

There are several ways to realize the single calibration camera position arrangement:
  Covering the diffuser screen 12 with a matt white paper like surface. It is used when the calibration camera is inside the display, or practically at the front-projection 3D movie arrangement.
  Covering the diffuser screen 12 with another 90 degree rotated asymmetric diffuser screen 12. It is used when the calibration camera is outside the display.
  Replacing the screen 12 with a diffuse sheet (frosted white glass). It is used when the calibration camera is outside the display and the brightness of the display is not very low.

In the case of smaller displays the calibration is practically done only once after manufacturing, because those displays are usually firm mechanically and electrically, their tiny projectors are not going wrong normally, while the large displays usually must be calibrated after relocation or projector replacement.

The particular embodiment in FIG. 6 comprises a single image detector 20 arranged on the same side of the diffuser screen 12 as the projectors 10. The image detector 20 preferably detects 2D test image patterns successively projected with each of the projectors 10 onto the diffuser screen 12.

Alternatively, the calibration device may comprise multiple image detectors arranged on the opposite side of the diffuser screen 12 than the projectors 10 (not shown). In this case the image detectors detect the images simultaneously projected by the projectors 10 onto the diffuser screen 12.

The evaluating means of the calibration device is preferably capable for establishing a difference between the detected image and a theoretical error-free image. The evaluating means, the calibration data generating means and the modifying means are preferably implemented as computer program modules running in the control system of the apparatus.

In the calibration process the images projected by the multiple projectors 10 are detected with the image detector 20, the detected images are evaluated and calibration data is generated for the projectors based on the evaluation. Finally, the input data of the projectors are modified on the basis of the respective calibration data. The detecting, evaluating, calibration data generating and input data modifying steps are preferably performed periodically.

The 3D display calibration measures the physical properties of the light beams emitted by the display. The method collects information on the direction, angle, color and intensity values of the addressable light beams of the projectors 10. Direction and angle properties are measured during the geometry calibration; color and intensity values are estimated by the light calibration.

The process of geometry calibration using image detector (e.g. camera) comprises the steps:
1. First to align the image detector and the display surface (e.g. calibration screen) using the physical border of the screen. The border is also used to calibrate the image detector (if more then one is present in the system) to each other.
2. Next, projector pixels are identified on the captured camera images. It is achieved using some coding:
   a) Gray coding of projector pixel coordinates
   b) Quasi random color coding of pixels, where there only one instance exist of each n-by-m color block. The uniqueness guaranties that, each block can found both on the camera and projector images.

The draft camera-projector pixel correspondence is further refined using an image of points placed in a grid.
3. In the next step combining the output of the previous two steps, the mapping from the projector to the (calibration) screen is calculated. (Its inverse is calculated as well, if required).
4. After finding the exact hit points of the rays on the screen emitted by the display, the addressable light beams are estimated using a mathematical model of the optical modules.

Though, errors due to the uncalibrated projectors are negligible, the result is further refined by finding more accurate projection parameters using the display physical latitudes.

Light calibration is to compensate the brightness, contrast, gamma non-linearity and color differences between the projectors, depending on the viewing directions, and the process can preferably performed in the steps of:

1. positioning of the image detector, camera to a certain viewing direction,
2. projector identification and conciliation with segments on the captured camera image,
3. image detector based measurements of certain uncalibrated intensity levels on each projector,
4. image detector based color balance measurements on each projector,
5. calculation of best/desired intensity and color balance values per projector,
6. iterative adjustment of intensity and color balance, based on the comparison of calculated/desired values and actual measured values, and
7. repetition of the above steps for certain viewing directions.

The calibration is applied to adjust the deviating values of the multiple channels to each other, however overall image geometry distortion and intensity/color homogeneity improvement is performed at the same time. Not just matching of individual projector image parameters is performed, but inherent limitations of projectors, like the uneven illumination between the center and the corners are compensated in this manner (inter-channel and intra-channel calibration).

In a preferred embodiment of the calibration method, a 2D test image pattern is successively projected with each of the projectors 10 onto the wide-angle diffuser screen 12w covering diffuser screen 12. The test image pattern practically extends on the entire display area of the diffuser screen 12w. All of the projected test image patterns are detected one after the other during the detecting step by means of the image detector 20. In the evaluation step at least one of the following is evaluated: the test image patterns are appearing coincidentally on the diffuser screen 12, the test image patterns have that same brightness/contrast, the test image patterns have that same color. In the calibration data generating step the calibration data is generated for compensating optical imperfections, distortions, geometrical or color misalignments, and/or brightness/contrast differences between the projectors 10.

Practically, a test image may be a simple cross or similar known test image, which is easily identifiable by a pattern recognition software. A control system of the apparatus instructs the projectors to project the test image to well-defined locations, for example on a test grid. The test grid may be physically attached to the screen 12, or it may be just calculated from the camera image. The control system may then detect the generated test image with the image detector 20. The control system contains a suitable software adapted for evaluating the detected image. The software also detects the true positions of the projected test images, and determines the difference between the true positions and the nominal positions. Based on these differences, the calibration software generates the calibration data for the relevant projectors. Nominal positions are the theoretically correct projection positions of the test images. Based on the calibration data, the control system will perform the necessary modification in the projection positions, it will perform a predistortion on the image data to be projected in real-three. The projection positions are preferably modified by translating the 2D image on the 2D display within the projector, though it would be also possible to mechanically adjust the projection optics, a software solution is preferred. Both the positioning errors and the imaging distortions can be corrected in a similar manner.

When the calibration data has been thus obtained, the control system modifies the data input into the projectors. This means that the image data are subjected to an "inverse distortion" transformation, which cancels the optical distortion. As a result, the projector will be projecting a near distortion-free image to the screen. Preferably, the calibration data are stored for each projector.

For video images, the modification of the input data of the projectors with the corresponding calibration data and the sending the modified image data to the projectors or to the 2D displays in the projectors is performed in real-time. In theory, it is also possible to perform a calibration of a video data sequence in advance, before performing the actual projection, but this would require the storing or large amounts of data, and therefore less practical.

In a further preferred embodiment of the calibration method the detecting, evaluating, calibration data generating and input data modifying steps are performed continuously or quasi-continuously during the normal operation of the apparatus. "Continuously" in this context means that a continuous calibration is achieved by detecting the actually displayed images and effecting a modification of the input of the projectors so as to minimize the differences of the appearing and the error-free image. "Quasi-continuously" in this context means that the calibration is carried out repeatedly at very short periodic intervals. Such calibration patterns can be projected outside of the active screen area, onto special sections on the screen frame, or flashing in very short time, that is invisible to the viewers, not disturbing normal display operation.

If the apparatus is calibrated and operating conditions will not change, the calibration device can be removed. The embodiment in FIG. 6 can be advantageously used for displaying advertising 3D images in shop windows.

In a preferred embodiment the calibration software is responsible for generating so called calibration data files. The calibration data is used by the software environment to compensate all the geometry/image distortions and light/color mismatches in real-time or off-line rendering methods.

FIGS. 7A and 7B are schematic views of a third embodiment for use in a 3D home cinema or for 3D presentations. The projectors 10 and the image detector 20 of the calibrating device are arranged in a single projecting unit, separated from the screen 12. The projecting unit can be fixed to a ceiling and is directed to the diffuser screen 12, in this embodiment being a reflective screen in contrast to the previous embodiments having transmissive ones.

The reflective diffuser screen 12 in front projection arrangements can be retroreflective or mirror-like reflective surface. The reflective screen can be itself a metallized transmission diffuser screen 12, or it is possible to use either front surface mirror or retroreflective sheet as a reflective layer for transmission screens 12. In this case because of the double pass, the diffuse angles of the diffuser screen 12 are set narrower.

When using a mirror as a reflection layer the control is the same, however with a retroreflective layer the sidewise opposite geometry result in different 2D images to be projected. The retroreflective screen 12 can result in more practical arrangement, since the light beams are reflected back towards the projectors thus the useful viewing area comes between the projectors and the screen, as seen on FIG. 8A, better matching indoor room installations. It is possible to use curved reflective screen to optimize the viewing area, as seen on FIG. 8B.

When combined with asymmetric diffuser the retroreflective surface can be a 1D retroreflector structure, easy to manufacture as a prismatic film. FIG. 8C shows a preferable retroreflective screen structure, with asymmetric diffuse structure on the front surface and a metalized prism structure 1D retroreflective surface in the back side.

One of the most important embodiment and application of the invented system is the glasses-free 3D cinema.

Figure 7C:
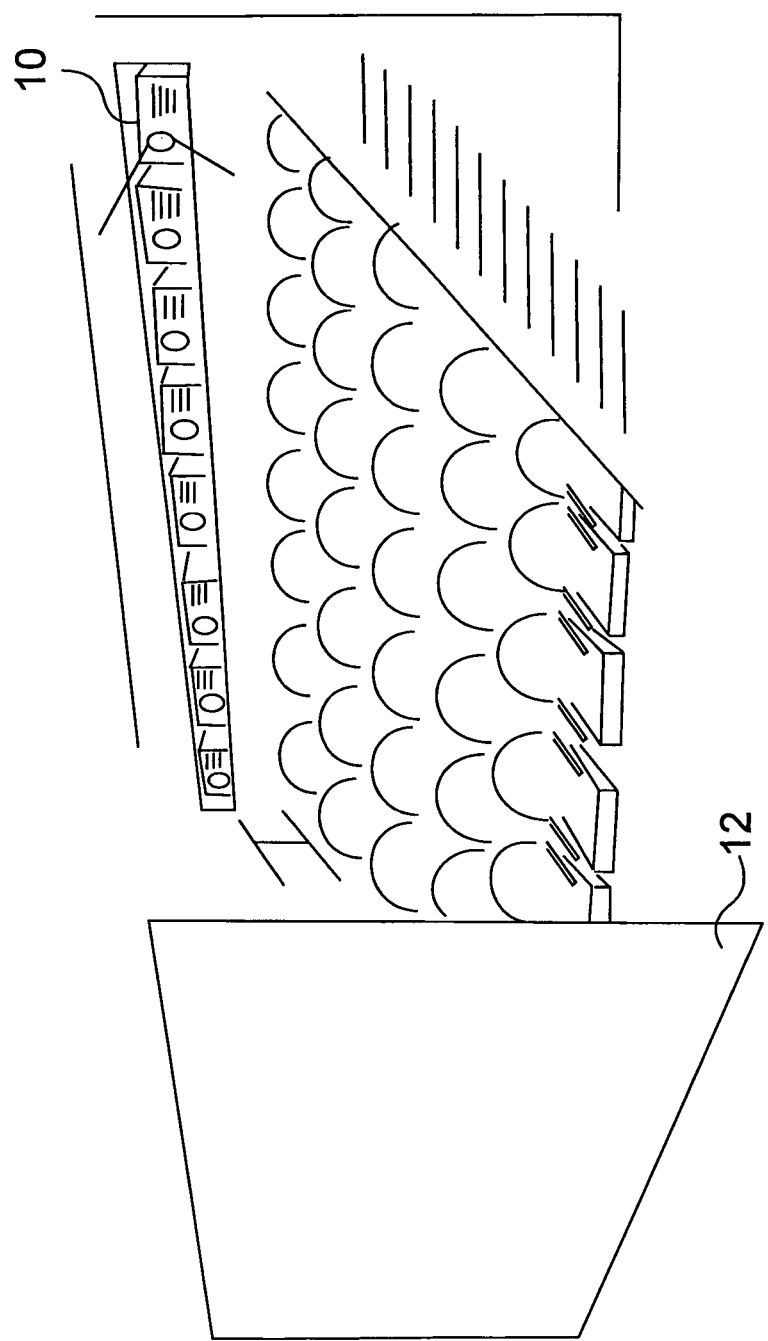

FIG. 7C depicts a 3D cinema having a reflected 3D light-field generated according to the invention. The invention realizes a distributed projection and 3D image generation principle. Instead of using one high-end, i.e. high-resolution, high-lumen, high-cost projector, the apparatus according to the invention can use multiple low-lumen, low-cost projectors. Instead of one 50k$ projector, using 100 pcs. of 500$ projectors, can provide much more pixels and lumens and it is possible to advantageously build systems with much higher performance for the same price. As it is apparent from the discussion above, the big advantage of such 3D cinemas is that no 3D glasses are required for generating the perceived 3D effect. The system can take the advantage of seated viewers, having a predetermined viewing position with a given range. It is possible to periodically display the same narrow angle 3D or stereo content to each viewers, without configuring the hardware. Various format 3D materials can flexibly be shown to individual, fixed position viewers, or group of freely moving viewers just by changing the control.

Figure 9:
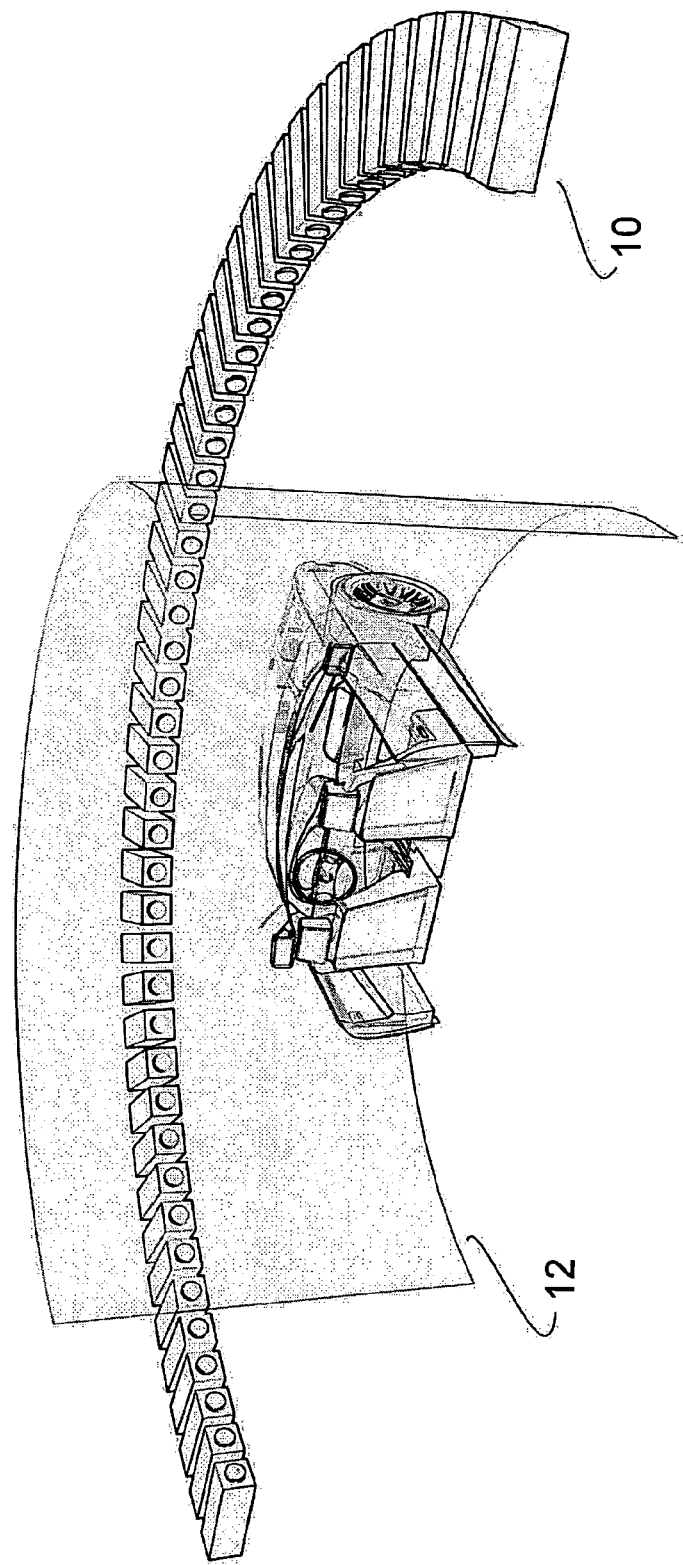
FIG. 9 is a schematic diagram of the inventive apparatus with a curved screen.

FIG. 9 shows a schematic diagram of a similar embodiment of the inventive apparatus with a curved screen 12 with projectors 10 arranged accordingly on a concentric curve, that is optimized for simulation and other VR applications. The HOP apparatus i.e. the length of the screen 12 and number of projectors 10 can arbitrarily be scaled horizontally.

Such arrangements complemented by multiple cameras, placed along the upper edge of the screen 12, or behind in case of a partly transparent screen, can advantageously used in telepresence systems, showing highly realistic 3D view of the distant persons and surroundings.

Figure 13B:
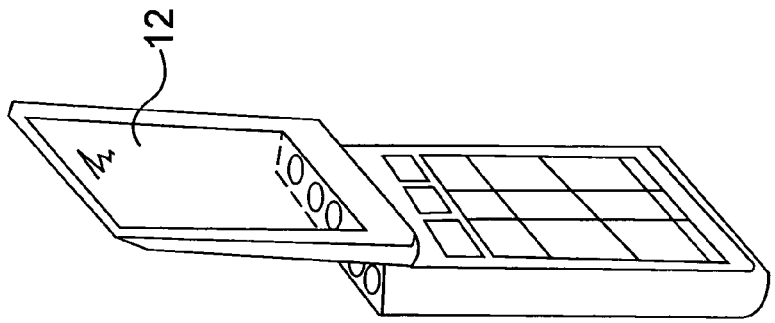
FIGS. 13A and 13B are schematic views of a seventh embodiment used in a mobile phone.
Figure 13A:
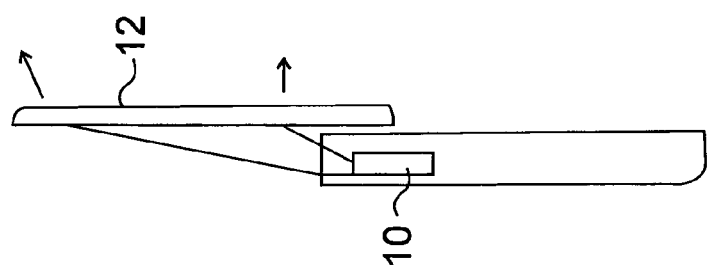
Figure 12A:
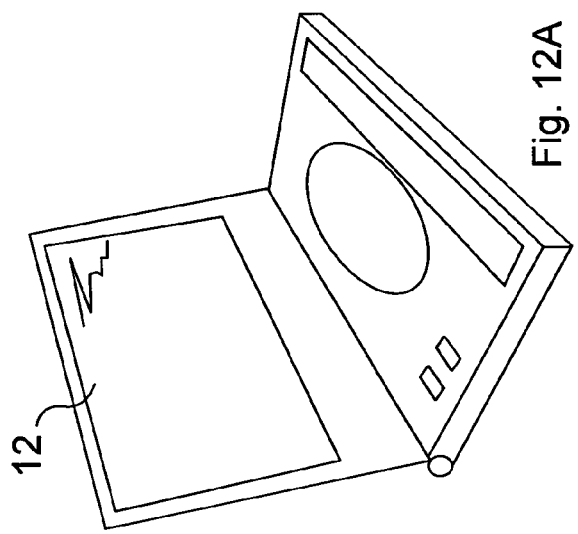
FIGS. 12A and 12B are schematic views of a sixth embodiment used in a portable DVD player.
Figure 12B:
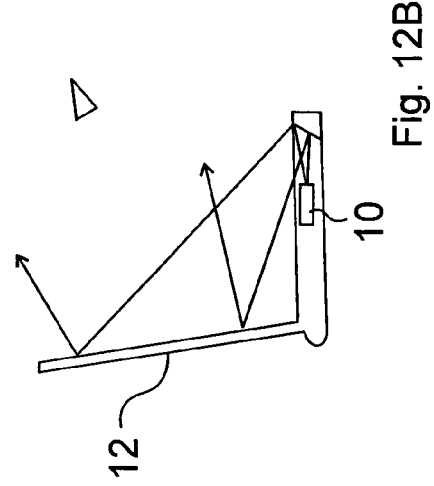

FIGS. 10A and 10B are schematic views of an embodiment adapted to be used in a PDA device. The projectors are embedded into the housing of the PDA and are projecting onto the foldable transmissive diffuser screen 12. FIG. 11. is a schematic view of a further embodiment used in a mini laptop device and functioning in the same way as the embodiment in FIGS. 10A and 10B to realize projection style 3D computer screen. FIGS. 12A and 12B are schematic three-dimensional and side views of an embodiment used in a portable DVD player, the embodiment having a reflective diffuser screen 12. FIGS. 13A and 13B are schematic side and three-dimensional views of an embodiment for use in a mobile phone, enabling high-resolution 3D projection mobile phones.

Such compact size embodiments of the invented apparatus can advantageously be used in state-of-the-art car dashboards, as 3D projection displays, providing high-resolution 3D images dedicated to the driver's viewing area.

FIG. 16A is a schematic cross sectional view of a compact pico-projector architecture for the apparatus, wherein illumination is effected by a LED based lamp 31 via a beam splitter 32. The 2D image to be projected is generated by a microdisplay 34. The light beams travelling from the lamp 31 to the microdisplay 34 and from the microdisplay 34 outwards are travelling twice through the lenses 33, thereby doubling their effects and resulting in a more compact structure. Focusing to the diffuser screen 12 is achieved by an objective 35 at the exit of the projector 12. FIG. 16B is a schematic view of an embodiment of the projector having an inner structure depicted in FIG. 16A.

The invention is not limited to the shown and disclosed embodiments, but other elements, improvements and variations are also within the scope of the invention.

The invention claimed is:

1. A method for displaying 3D images comprising the steps of
projecting 2D images by means of multiple projectors (10) onto a diffuser screen (12), the 2D images generating together a 3D light-field (13), wherein 2D views of the 3D light-field (13) are composed of sections of multiple projector (10) images,
wherein the diffuser screen (12) comprises a uniform optical structure, and has a diffusion angle ($\sigma$) being equal to or larger than the largest angle ($\alpha$) between optical centers (11) of neighboring projectors (10) as seen from any screen point, the diffuser screen (12) thereby performing a limited diffusion—without changing the main direction of light beams projected onto the screen (12)—to eliminate inhomogeneities resulting from gaps between neighboring projectors (10) and to enable smooth transitions between the 3D images in the 3D light-field (13) when a viewer's position in the 3D light-field (13) changes.

2. The method according to claim 1, characterized by applying multiple projectors (10) which are arranged horizontally, and applying a diffuser screen (12) with an asymmetric diffusion character, wherein the diffusion angle ($\sigma$) is the horizontal diffusion angle of the diffuser screen, and the vertical diffusion angle ($\sigma_v$) of the screen (12) is larger than its horizontal diffusion angle.

3. An apparatus for displaying 3D images, the apparatus comprising a diffuser screen (12) and multiple projectors (10) projecting 2D images onto the diffuser screen (12), the 2D images generating together a 3D light-field (13), wherein
the 3D images correspond to respective viewer's positions in the 3D light-field (13),
2D views of the 3D light-field (13) are contributed by multiple projectors (10), and the viewers see sections of multiple projector (10) images within the 3D image on the different screen (12) areas, and
the diffuser screen (12) comprises a uniform optical structure and has a diffusion angle ($\sigma$) being equal to or larger than the largest angle ($\alpha$) between optical centers (11) of neighboring projectors (10) as seen from any screen point, the diffuser screen (12) thereby performing a limited diffusion to eliminate inhomogeneities resulting from gaps between neighboring projectors (10) and enabling smooth transitions between the 3D images in the 3D light-field (13) when a viewer's position in the 3D light-field (13) changes.

4. The apparatus according to claim 3, characterized in that the multiple projectors (10) are arranged horizontally, and the diffuser screen (12) has an asymmetric diffusion character, wherein the diffusion angle ($\sigma$) is the horizontal diffusion angle of the diffuser screen, and the vertical diffusion angle ($\sigma_v$) of the screen (12) is larger than its horizontal diffusion angle.

5. The apparatus according to claim 3, characterized in that the projectors (10) are video projectors, data projectors, video projector optical engines, RPTV optical engines, LED projectors, laser projectors, micro-, nano-, or pico-projectors, projectors based on scanner components, or projectors based on microdisplays like DMD, LCOS, OLED or LCD.

6. The apparatus according to claim 3, characterized in that the projectors (10) are based on diffractive imaging, containing microdisplays enabling lens-less holographic projection to the screen.

7. The apparatus according to claim 3, characterized in that the diffuser screen (12) is a holographic screen, a microlens screen, a volumetric diffusion screen, a lenticular screen, a retroreflective screen, a refractive or diffractive diffuser sheet, Fresnel lens or any combination thereof, or a surface created by a laminar flow of a substance.

8. The apparatus according to claim 3, characterized in that the screen (12) comprises more than one diffusive layers aligned slightly rotated relative to each other.

9. The apparatus according to claim 3, characterized in that the screen (12) has a controllable diffusion by comprising an active diffuse layer, like a switchable LC film.

10. The apparatus according to claim 3, characterized in that the screen (12) is transparent with partly diffusing character transmitting a part of the incident light without diffusion.

11. The apparatus according to claim 3, characterized in that the screen (12) further comprises
   layers directing the projected light beams optimally towards the viewers typical height, like direction turning films, cylindrical Fresnel lenses, or
   layers blocking light incident from other directions than from the projectors (10), typically lenticular arrays with black matrix.

12. The apparatus according to claim 3, characterized by being a portable 3D device—preferably a 3D mobile phone, a 3D DVD player, a 3D game set, a 3D GPS set or the like—comprising multiple projection modules, preferably compact size pico projectors (10), wherein the diffuser screen (12) is moveable into an optimum projection position for displaying 3D images, a control system and batteries allowing autonomous operation.

13. The apparatus according to claim 3, characterized by being a 3D cinema apparatus, wherein the projectors (10) and the diffuser screen (12) are arranged in a front projection configuration, wherein the diffuser screen (12) is of a 1D retroreflective or mirror-like reflective surface and the projectors are preferably arranged in an off-axis position above the viewers area.

14. The apparatus according to claim 13, characterized in that the 3D light-field (13) projected by the projectors (10) is split into multiple narrower angle zones, projecting 3D content periodically repeated for fixed view positions.

15. The apparatus according to claim 3, characterized by comprising a control system autonomously calculating intermediate images from the images inputted to the apparatus, where the number of input images is less than the number of projectors (10), or the input 3D information does not contain all the information necessary to drive all the projectors (10).

16. The apparatus according to claim 15, characterized in that the control system comprises an input device, such as a camera, IR sensor or other tracking device for assisting in optimization for the viewers position, to create highly realistic 3D images rendering environmental illumination on the 3D objects, performing texture mapping, shading or enabling interactions with the displayed 3D objects.

17. A method for calibrating an apparatus according to claim 3, comprising the steps of
   detecting the images projected by the multiple projectors (10) with at least one image detector (20), evaluating the detected images and generating calibration data for the projectors based on the evaluation, and modifying the input data of the projectors on the basis of the respective calibration data.

18. The method according to claim 17, characterized in that the detecting, evaluating, calibration data generating and input data modifying steps are performed periodically.

19. The method according to claim 17, characterized by successively projecting a 2D test image pattern with each of the projectors (10) onto a wide angle diffuser screen (12w) replacing or covering the screen (12), the test image pattern extending on the entire display area of the wide angle diffuser screen (12w), wherein all of the projected test image patterns are detected during the detecting step by means of a single image detector (20) arranged on the same side of the diffuser screen (12) as the projectors (10).

20. The method according to claim 19, characterized in that
   in the evaluation step at least one of the following is evaluated: the test image patterns are appearing coincidentally on the diffuser screen (12), the test image patterns have that same brightness/contrast, the test image patterns have that same color, and
   in the calibration data generating step the calibration data is generated for compensating optical imperfections, distortions, geometrical or color misalignments, and/or brightness/contrast differences between the projectors (10).

21. The method according to claim 17, characterized in that the detecting, evaluating, calibration data generating and input data modifying steps are performed continuously or quasi-continuously during the normal operation of the apparatus.

22. The method according to claim 17, characterized in that the projected images are detected by means of multiple image detectors arranged on the same side of the diffuser screen (12) as the projectors (10) for front-projection arrangements, or on the side of the diffuser screen (12) opposite than the projectors (10) for rear-projection arrangements.

23. A calibration device for calibrating an apparatus according to claim 3, comprising
   at least one image detector (20) for detecting images projected by the projectors (10) onto the diffuser screen (12),
   evaluating means for evaluating the detected images,
   calibration data generating means for generating calibration data for the projectors (10) based on the evaluation, and
   modifying means for modifying the input data of the projectors (10) on the basis of the respective calibration data.

24. The calibration device according to claim 23, characterized by comprising a single image detector (20) arranged on the same side of the diffuser screen (12) as the projectors (10), the image detector (20) being capable of detecting 2D test image patterns successively projected with each of the projectors (10) onto the diffuser screen (12).

25. The calibration device according to claim 23, characterized by comprising multiple image detectors arranged on the same side of the diffuser screen (12) as the projectors (10) for front-projection arrangements, or on the opposite side of the diffuser screen (12) than the projectors (10) for rear-projection arrangements, the image detectors being capable of detecting the images simultaneously projected by the projectors (10) onto the diffuser screen (12).

26. The calibration device according to claim 23, characterized in that the evaluating means is capable for establishing a difference between the detected image and a theoretical error-free image.

27. The calibration device according to claim 23, characterized in that the evaluating means, the calibration data generating means and the modifying means are implemented as computer program modules running in a control system of the apparatus.

* * * * *